(No Model.)
W. STANLEY, Jr.
ALTERNATING CURRENT ELECTRIC MOTOR.
No. 591,301. Patented Oct. 5, 1897.
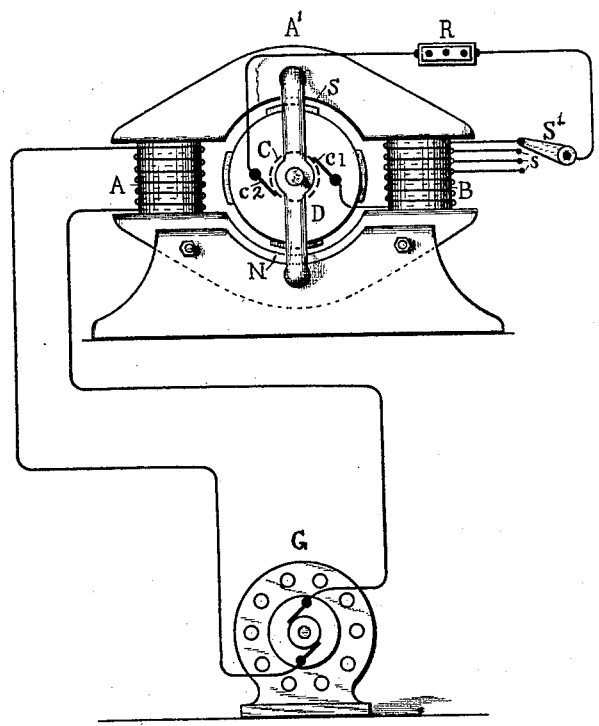
WITNESSES:
George Brown Jr.
Caroline E. Davidson
INVENTOR
WILLIAM STANLEY JR.
BY
Pope, Edgecomb & Terry.
ATTORNEYS
THE NORRIS PETERS CO., PHOTO-LITHO., WASHINGTON, D. C.

UNITED STATES PATENT OFFICE.

WILLIAM STANLEY, JR., OF GREAT BARRINGTON, MASSACHUSETTS, ASSIGNOR, BY MESNE ASSIGNMENTS, TO THE WESTINGHOUSE ELECTRIC AND MANUFACTURING COMPANY, OF PITTSBURG, PENNSYLVANIA.

ALTERNATING-CURRENT ELECTRIC MOTOR.

SPECIFICATION forming part of Letters Patent No. 591,301, dated October 5, 1897.

Application filed October 23, 1888. Serial No. 288,983. (No model.)

*To all whom it may concern:*

Be it known that I, WILLIAM STANLEY, Jr., a citizen of the United States, residing in Great Barrington, in the county of Berkshire and State of Massachusetts, have invented certain new and useful Improvements in Alternate-Current Electric Motors, (Case No. 244,) of which the following is a specification.

My invention relates to the class of electric motors designed to be operated by alternating electric currents.

The object of the invention is to provide a motor which will operate at a constant speed under variations in load applied to it, and will also be economical in its operation and applicable to the various uses to which direct-current electric motors are now commonly applied.

The invention consists, in general terms, in constructing a field-magnet with two distinct coils, one of which is designed to be included in an alternating-current electric circuit and the other to have its terminals closed upon themselves and constitute a secondary circuit in which currents are induced by the action of currents transmitted through the first-named coil. The effect of the currents induced in this second coil is to create consequent poles at points between the two coils. An armature is mounted between the consequent poles thus formed and its coils may be connected in the circuit of the second coil applied to the field-magnet or closed upon themselves independently thereof.

The invention and its operation will be described in detail in connection with the accompanying drawing, which is an end view of a motor embodying the invention.

Referring to the figure, A' represents the field-magnet core, and A and B represent two coils wound upon the respective arms of the core. The coils A are designed to be connected in the circuit of any suitable source of alternating electric currents—such, for instance, as an alternate-current electric generator G. One terminal of the coils B is connected with the brush $c'$, applied to a commutator C of the armature D. The other brush $c^2$ is connected with a switch S', by means of which the circuit connections may be completed with the coil B. An adjustable resistance R may be included in this circuit, if desired. The switch S' is provided with several contact-points $s$, which are connected at different points in the length of the coil B, so that the amount which is included in circuit at any time may be varied. When an alternating electric current is sent through the coils A, if the circuit connections of the coil B are interrupted the counter electromotive force developed in the coil A will tend to oppose the flow of current through that coil, and by suitably proportioning the coils practically no current will flow. If now the terminals of the coils B are connected, a current will flow in the coil B, which in turn acts as a primary upon the coil A. This current will therefore develop an electromotive force which is in the same direction as the applied electromotive force and tends, therefore, to neutralize to a corresponding extent the counter electromotive force in the coil A. Therefore more current will flow through the coil A. The currents thus caused to flow in the two coils A and B will be in opposite directions and tend to establish poles at N and S. The amount of magnetism on the part of the field-magnets, it is evident, will depend upon the current flowing through the coil B.

The alternating current developed in the coil B will traverse also the armature-coils, and if its connections with reference to the commutator be properly adjusted there will be a tendency on the part of the armature to revolve in a given direction. As the armature revolves it develops an electromotive force which is counter to that applied thereto from the coil B and therefore in effect becomes a resistance opposed to the current in the coil B, and this varies with the variations of speed due to variation in the work being done, so that the current flowing from the coil B through the armature will to a certain extent vary inversely as the speed. The greater the speed the less will be the current. By keeping the field strength within certain definite limits the supply of currrent from the coil B and consequent polar influence attendant upon it can be made to self-regulate the motor.

The effects of the coil B may be modified as required by means of the switch S', thus increasing or decreasing the difference of potential applied to the armature. By means of the resistance R the operation of the motor may be still further modified.

The winding of armature employed may be variously modified. It may be of either the open-circuit or closed-circuit type, and it may have any required number of coils.

I claim as my invention—

1. An electric motor consisting of a field-magnet having a closed core and having two coils, one adapted to be connected in series with a source of alternating electric currents, and the other acting as a secondary coil with reference to the first, whereby the effects of the current induced in the latter and the current flowing in the former combine to establish poles in the field-magnet core, and an armature in the field of force thus established.

2. The combination in an electric motor of a field-magnet having a closed core, a coil applied to such field-magnet connected to the source of supply, a second coil receiving current by induction therefrom, and an armature having its coils supplied with current from said second coils of the field-magnet.

3. In an alternating-current electric motor having consequent field-magnet poles, the combination of independent armature and field-magnet coils, and a second set of field-magnet coils connected in circuit with the armature-coils.

4. In an alternating-current electric motor, the combination of a field-magnet and armature having independent coils, of a second set of field-magnet coils through which the armature-coils are connected, and means for modifying the effective length of the supplemental coils.

5. In an alternating-current electric motor, a field-magnet wound with two magnetizing-coils, one designed to be connected in an alternate-current circuit, and the other to receive currents by induction therefrom, the currents traversing the latter coils tending to increase the field of force established by the currents in the former, and an armature traversed by the lines of force established by the field-magnet.

In testimony whereof I have hereunto subscribed my name this 11th day of October, A. D. 1888.

WILLIAM STANLEY, Jr.

Witnesses:
 CHARLES A. TERRY,
 C. C. WOLFE.